United States Patent [19]

Browne

[11] 4,142,976

[45] Mar. 6, 1979

[54] BAROMETRIC LEG FOR ROTARY VACUUM FILTER

[75] Inventor: Paul A. Browne, Orillia, Canada

[73] Assignee: Dorr-Oliver Incorporated, Stamford, Conn.

[21] Appl. No.: 866,578

[22] Filed: Jan. 3, 1978

[51] Int. Cl.² .............................................. B01D 33/06
[52] U.S. Cl. .................................. 210/404; 137/453; 137/590; 162/335; 210/406; 210/416 R
[58] Field of Search ................ 210/77, 161, 210, 217, 210/326, 402–404, 406, 416 R; 162/330, 331, 335, 357; 261/73; 137/453, 454, 590, 592

[56] References Cited

U.S. PATENT DOCUMENTS

| 1,195,253 | 8/1916 | Naslund | 137/592 |
| 3,409,137 | 11/1968 | Jackson et al. | 210/406 |
| 3,630,380 | 12/1971 | Barnebl et al. | 210/404 |

Primary Examiner—Frank Sever
Attorney, Agent, or Firm—Burtsell Joseph Kearns; Harold M. Snyder

[57] ABSTRACT

A rotary vacuum filter having a barometric or drop leg for generating vacuum in the filtration cycle of the filter wherein the end of the leg immersed in the seal pit is formed to a frustro-conical configuration for both reducing turbulence in the seal pit as the air-liquid mixture exits therefrom and for recovering a portion of the energy in the velocity head of the air-liquid mixture flow.

9 Claims, 7 Drawing Figures

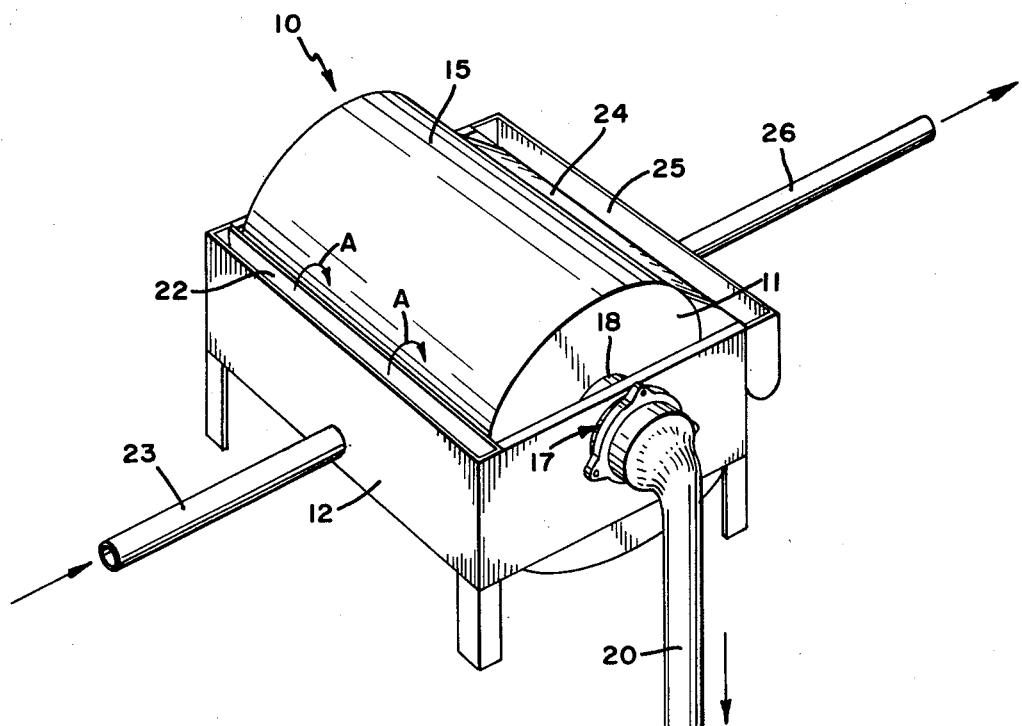
FIG. 1
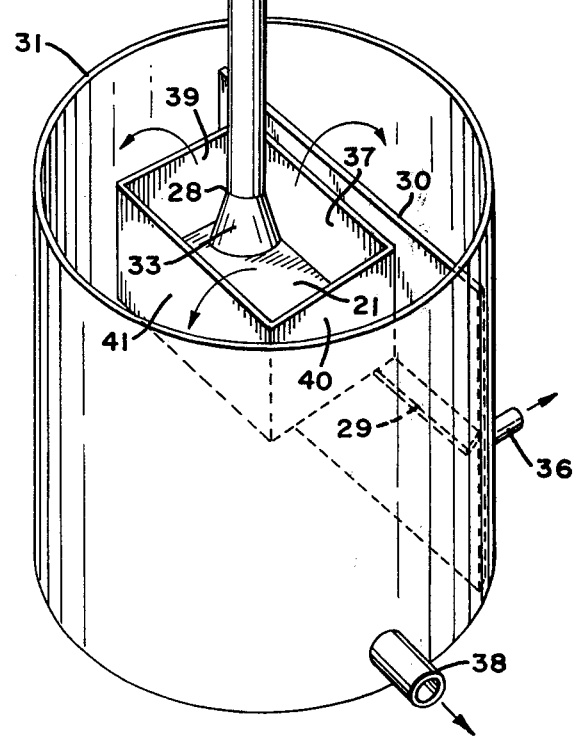

BAROMETRIC LEG FOR ROTARY VACUUM FILTER

BACKGROUND OF THE INVENTION

The present invention relates to improvements in filters and more particularly to rotary vacuum filters of the type utilized in the pulp and paper industry for filtering pulp slurries.

Rotary vacuum filters are well known and utilize filtration members which comprise either a rotatable cylindrical drum or spaced cylindrical discs mounted for rotation in a tank adapted to receive a feed slurry. Filter media is provided about the outer surface of the filtration members and as the latter are rotated a sub-atmospheric pressure vacuum is created in portions thereof through a period of the filtration cycle as the members are rotated through the slurry to draw filtrate from the slurry into the filtration members and form a filter cake on the surface of the filter media. A valve assembly is provided to cut off the vacuum during other periods of the filtration cycle when the cake bearing portion is clear of the tanks whereat the filter cake is removed from the filter media by any well known doctoring means. The supply and cut off of the sub-atmospheric pressure vacuum is controlled by a valve assembly which is located concentrically with the center of the filtration members at an end trunnion and through which valve assembly the filtrate is withdrawn outwardly of the filter.

The sub-atmospheric pressure necessary to achieve the mentioned desired vacuum in filters of this type is often created by use of a barometric leg and the present invention is directed to improvements in the performance characteristics thereof. Barometric legs or drop legs, as they are also called, comprise elongated pipes which depend from the filtrate control valve assembly to a filtrate tank located at a position below the filter with the free end of the leg submerged in a seal pit located in the filtrate tank. In some instances the filter may be located on one floor of the operating plant while the drop leg extends from the valve assembly to the floor below in order to achieve a leg of sufficient length whereby the velocity of the air-liquid exiting from the valve assembly and moving down the leg is sufficient to sustain a vacuum in the filtration members during the filtration cycle. The barometric leg offers a simple energy conserving means for draining filtrate from a filter since it functions as both an efficient filtrate pump and air compressor with the input power supplied by the liquid drop in the leg, the vertical length of which varies as is necessary for effective operation.

In use as the filtrate and air mixture drawn from the filter exits from the valve assembly to the drop leg, heat is produced due to friction and turbulence created by the pipe walls of the leg and fittings. The velocity of the air liquid mixture varies with the pressure within the leg and becomes less as the air is compressed. The kinetic energy possessed by the air liquid mixture is converted to heat upon exit from the drop leg into the seal pit causing turbulence in the liquid therein. It has been found that the turbulence created within the seal pit results in a noticable loss of energy in the filtration system and a consequent reduction of operating vacuum in the filter.

It is an object of the present invention to provide an improved barometric leg assembly for a rotary vacuum filter.

It is a further object to provide a novel barometric leg which reduces the velocity head of the air-liquid flow exiting from the leg to correspondingly reduce turbulence in the seal pit resulting in a pressure gain and an increased vacuum in operation of the filter.

Another object is to provide novel means for shortening the length of the barometric leg without a corresponding loss in efficiency of operation thereof.

A still further object is to provide a novel barometric leg having a drop velocity high enough for air entrainment and with an exit velocity from the leg low enough to prevent wasted power in turbulence within the sealed pit.

SUMMARY OF THE INVENTION

The present invention contemplates a novel barometric or drop leg for a rotary vacuum filter. In one embodiment the barometric leg comprises an elongated vertical pipe member depending from the filtrate vacuum control valve assembly and terminating in a seal pit at which the filtrate and air mixture exits. The end of the drop leg within the seal pit is provided with a frustro-conical shaped surface or evase of preselected dimensions to slow the filtrate and air mixture as it exits from the drop leg to reduce the turbulence and recover a part of the velocity head. In this manner a pressure regain is effected in the leg resulting in increased vacuum pressure for the filter.

The above and other objects and advantages of the present invention will appear more fully hereinafter from a consideration of the detailed description which follows taken together with the accompanying drawings wherein two embodiments of the invention are illustrated.

DESCRIPTION OF THE DRAWINGS

In the drawings:

FIG. 1 is a perspective schematic illustration of a rotary drum vacuum filter and barometric leg therefor incorporating one embodiment of the present invention;

DETAILED DESCRIPTION

Figure 2:
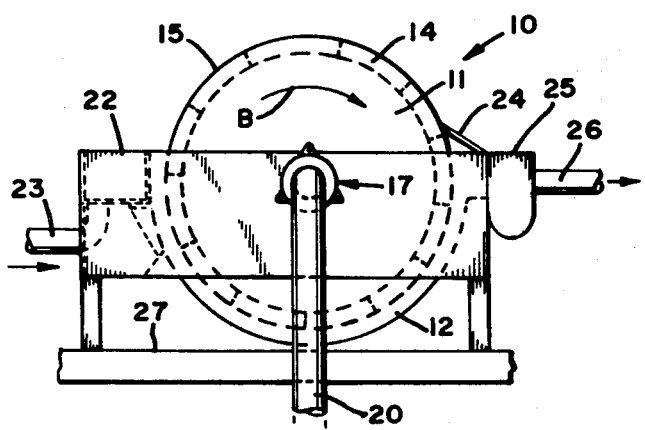
FIG. 2 is a fragmentary side elevational view of the apparatus of FIG. 1 with portions of the seal tank for the barometric leg broken away to disclose interior structure thereof.
Figure 3:
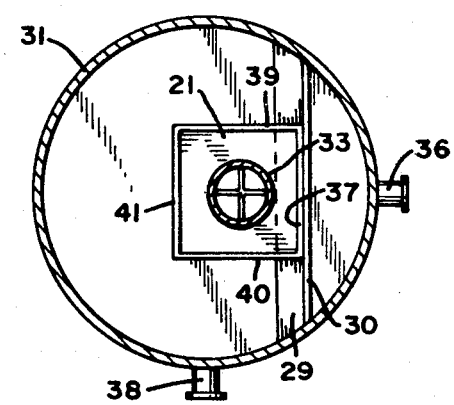
FIG. 3 is a sectional view taken on the line 3—3 of FIG. 2.
Figure 4:
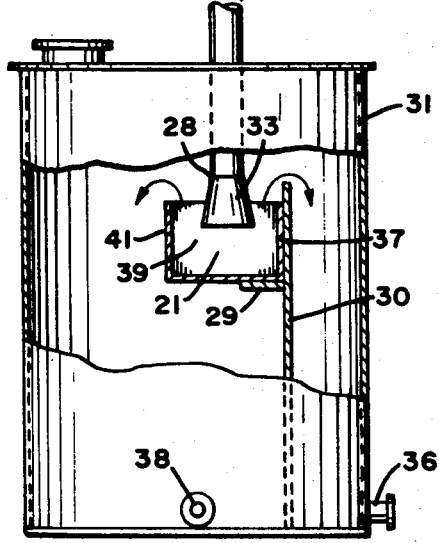
FIG. 4 is an enlarged view of the evase end of the barometric leg.
Figure 4:
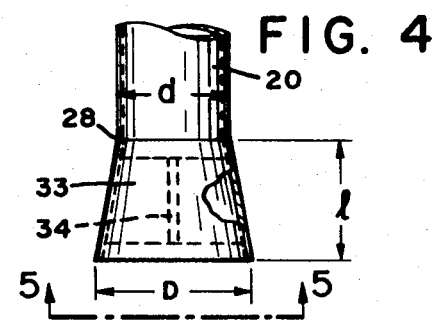

Referring now to the drawings for a more detailed description of the present invention a rotary vacuum filter comprising a rotary drum pulp washer incorporating an embodiment thereof is generally indicated by the reference numeral 10 in FIG. 1. Filter 10 comprises a cylindrical drum 11 adapted for rotation in a well known manner in arcuated shaped tank 12 containing a pulp slurry. Drum 10 includes a plurality of suitable filtrate compartments 14 (FIG. 2) and is provided with a filter media 15 such as a filter cloth about the outer surface thereof. Drainage connections (not shown) are provided in drum 11 between filter compartments 14 and a stationary valve assembly generally indicated by the reference numeral 17 in FIGS. 1 and 2 which is located concentric with end trunnion 18 of filter 10. A barometric or drop leg pipe 20 extends from valve assembly 17 to a seal pit 21 and functions to create a subatmospheric pressure or vacuum internally of drum 11 in a well known manner in accordance with the velocity of the air-liquid (i.e. filtrate) exiting from drum 11 through valve 17.

In use of filter 10 a liquid pulp slurry is fed to a feed box 22 through a feed pipe 23. The slurry is thereby distributed across the full length of filter 10 and as illustrated by the arrows A in FIG. 1 overflows from feed box 22 into tank 12. As drum 11 rotates in the direction of arrow B (FIG. 2) a vacuum is applied to the filtrate compartment 14 through barometric leg 20 and control valve assembly 17 to cause a suction whereby filter cake adheres to the surface of filter media 15 as it rotates through the slurry. Filtrate is drawn from filtrate compartments 14 outwardly of filter 10 through valve assembly 17 which functions to selectively cut off the vacuum at a point in the rotation cycle prior to drum 11 rotating past a doctoring device 24 which removes the filer cake from the surface of filter media 15 for discharge from outlet box 25 through outlet pipe 26 in tank 12. As drum 11 rotates past doctoring device 24 valve assembly 17 reapplies vacuum to drum 11 after it has reentered the slurry tank 12 in a continuous form of operation. A filter and valve assembly as hereinbefore described in of a generally well known type as are for example disclosed in U.S. Pat. Nos. 3,530,992 and 3,630,380.

As mentioned vacuum is created for filter 10 by the filtrate dropping down the barometric leg 20 from valve assembly 17 at a velocity predetermined by the selected length of barometric leg 20. It is the feature of the present invention to provide a novel barometric leg arrangement and to this end leg 20 (FIG. 2) extends below tank 12 through plant floor 27 with the free end 28 of leg 20 immersed in liquid contained in a rectangular shaped seal pit 21 which is mounted on a flange 29 of vertical inner wall 30 of the closed cylindrical filtrate tank 31. End 28 of leg 20 is provided with a frustro-conical shaped extension or evase 33 having crossed baffle plates 34 to prevent circular motion of the solution exiting from evase 33.

Filtrate tank 30 is provided with a first outlet pipe 36 for filtrate overflowing the upper edge of rear wall 37 of seal pit 21 which merges with wall 30. A second outlet pipe 38 is provided at the other side of wall 30 for normal overflow from seal pit 21 over side walls 39–40 and front walls 41 thereof. The upper edges of walls 39, 40 and 41 are lower than upper edge of rear wall 37 and wall 30. In this manner a normal or first flow of filtrate exits tank 31 through pipe 38 to be returned to the process stream and if the filtrate rises in tank 31 beyond a desired level it overflows wall 30 and exits tank 31 through pipe 36 to waste. In either event end 28 of leg 20 is sealed to a desired level in the filtrate at all times within pit 21.

In prior art devices it has been found that the exiting velocity of the air-liquid mixture from end 28 of leg 20 created a turbulence in seal pit 21 which resulted in a loss of power and corresponding loss of vacuum for a filter such as filter 10. The addition of evase 33 to leg end 28 having a cross-sectional dimension greater than that of leg 20 reduces and controls the exiting velocity sufficiently so as to greatly reduce turbulence in pit 21. As a result vacuum is increased and the length of barometric leg can be shortened as desired.

Figure 5:
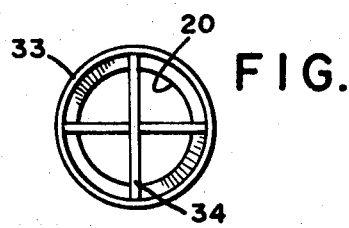
FIG. 5 is a bottom view of FIG. 4.
Figure 6:
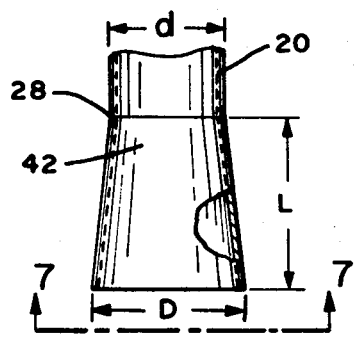
FIG. 6 is similar to FIG. 4 and illustrated another embodiment of the evase end of the barometric leg.
Figure 7:
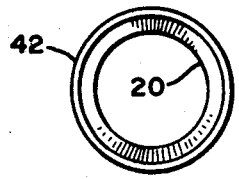
FIG. 7 is a bottom view of FIG. 6.

In another embodiment of this invention illustrated in FIGS. 5 and 6 the baffle plates 34 are removed from the interior of the evase 42 illustrated therein. Evase 42 functions in the same manner as evase 33. Evase 42 differs in that it is of a greater length than evase 33 thereby reducing circular motion of the exiting filtrate air solution without requiring baffles such as baffles 34.

In accordance with the present invention the size of evase 33 and evase 42 can be determined in accordance with the following formula as follows:

d = Inside Diameter of Barometric leg
D = $0.286\sqrt{\text{Filtrate Flow in U.S. GPM}}$
l = 2.72 (D-d)
L = 8.15 (D-d)

As will now be appreciated by those skilled in the art the present invention has many advantages. One advantage among others is that increased vacuum and/or shorter barometric legs are required thereby allowing for utilization of barometric legs in smaller operating areas than previously known.

Although two embodiments of the present invention have been illustrated and described in detail it is to be expressly understood that the invention is not limited thereto. Various changes can be made in the design and arrangement of parts without departing from the spirit and scope of the invention as the same will now be understood by those skilled in the art.

What is claimed is:
1. A rotary vacuum filter comprising:
   (a) a filtration member mounted for rotation in a slurry tank,
   (b) means for generating a vacuum for application to said filtration member during a portion of the rotation cycle for drawing filtrate from said tank into said filtration member,
   (c) valve means for controlling the application of said vacuum and the withdrawal of the filtrate from said filtration member outwardly of said filter,
   (d) a seal pit spaced from said valve means and arranged to receive said filtrate from said valve means,
   (e) said means for supplying the vacuum comprising an elongated cylindrical barometric leg depending from said filter and having one end connected to said valve means and the opposite free end extending into said seal pit, and through which barometric leg is transmitted said filtrate to said seal pit, and
   (f) a predetermined length of said free end of said leg formed to a selected cross-sectional dimension greater than the cross-sectional dimension of the remainder of said elongated barometric leg for reducing turbulence in said seal pit from air-filtrate exiting from said leg.

2. The filter of claim 1 wherein the free end of said barometric leg is cylindrical and wherein the inside diameter thereof is greater than the inside diameter of the remaining portion of said barometric leg.

3. The device of claim 2 wherein the free end of said barometric leg is of a frustro-conical shape configuration.

4. The device of claim 3 wherein said frustro-conical shaped end of said barometric leg is provided with interior baffle members for preventing rotation of the air-liquid mixture exiting therefrom.

5. The device of claim 4 wherein said baffle members comprise a pair of plate members arranged in crossed relationship across the inside diameter of said free end of said barometric leg.

6. A pulp washer comprising:
(a) a drum mounted for rotation in a pulp slurry tank and having a filter media provided about the outer cylindrical surface thereof,
(b) means for generating vacuum for supply to said drum during a portion of the rotation cycle of said drum for drawing filtrate into said drum through said filter media,
(c) valve means associated with said drum for controlling said vacuum and the withdrawal of the filtrate and air from said drum,
(d) a seal pit spaced from said valve means and arranged to receive said air-filtate mixture therefrom, said vacuum generating means comprising a barometric leg having one end connected to said valve means, a free end located in a seal pit, and an elongated cylindrical portion intermediate said ends, and (e) said free end of said barometric leg having a greater cross-sectional dimension than the cross-sectional dimension of said elongated portion for reducing turbulence in said seal pit from said air-filtrate exiting from said leg into said pit.

7. The pulp washer of claim 6 wherein said free end of said barometric leg is formed to a frustro-conical shape configuration increasing in cross section of dimensions from said elongated portion to the end thereof.

8. The pulp washer of claim 7 wherein baffle plates are arranged within said frustro-conical shaped portion for preventing rotation of air-filtrate mixture exiting from said barometric leg into said seal pit.

9. The pulp washer of claim 6 wherein said free end of said barometric leg is cylindrical and is provided with an inside diameter of increasingly greater dimensions than the inside diameter of the elongated portion of said barometric leg.

* * * * *